Nov. 19, 1963    O. BUTLER    3,111,185
CONTROL SYSTEM FOR PUBLIC CARRIER VEHICLES
Filed June 30, 1961    2 Sheets-Sheet 1

INVENTOR.
Oscar Butler
BY
Hovey, Schmidt, Johnson & Hovey
ATTORNEYS.

Nov. 19, 1963     O. BUTLER     3,111,185
CONTROL SYSTEM FOR PUBLIC CARRIER VEHICLES
Filed June 30, 1961     2 Sheets—Sheet 2

INVENTOR.
Oscar Butler
BY
Hovey, Schmidt, Johnson & Hovey
ATTORNEYS

United States Patent Office 3,111,185
Patented Nov. 19, 1963

3,111,185
CONTROL SYSTEM FOR PUBLIC CARRIER
VEHICLES
Oscar Butler, 2838 Euclid, Kansas City, Mo.
Filed June 30, 1961, Ser. No. 121,036
12 Claims. (Cl. 180—82)

This invention relates to an electrical control system for public carrier vehicles and, more particularly, to a system for coercing the operator of such a vehicle to record each passenger carried by the vehicle. In the past it has been difficult to insure that the management of public passenger carrier companies receive an accurate tally of the passengers transported by their individual vehicles during a given time period. Inasmuch as the receipts from such vehicles are normally a function of the number of passengers carried and the time or distance of each passenger carrying trip, it is extremely important for the management to receive an accurate count of passengers carried to be able to properly audit the turn-in of the moneys collected by the drivers.

Accordingly, it is the most important object of this invention to provide an electrical control system operable to require the driver of a public carrier vehicle to make an accurate record of each and every passenger carried by the vehicle.

A further important object of my invention is to provide in such a system, means for rendering the vehicle inoperative if any passenger is not properly registered.

In connection with the foregoing object, it is an equally important object of this invention to provide such a system whereby the operation of the vehicle will be normal and will be completely unaffected by the system if a proper record is kept.

Still another important object of the instant invention is to provide a system which will automatically reset whenever a passenger leaves the vehicle, thereby insuring readiness for subsequent passenger transactions.

A yet further object of my instant invention is the provision of a system wherein the passengers may sit on any particular seat in the vehicle, or may move from seat to seat, yet it will be but necessary to register each passenger one time.

Another highly important object of this invention is the provision of means for rendering the vehicle inoperable upon the occurrence of tampering with the electrical control system.

Still another object of my invention is the provision of means for automatically disconnecting the vehicle starter from the battery when the ignition system is rendered inoperable for failure to register a passenger, thereby preventing discharge of the battery in fruitless attempts to start the vehicle without recording the passenger.

A yet further object of this invention is to provide means in such a vehicle control system for requiring the operator to properly initiate an individual electrical impulse for recording each passenger and to prevent the use of a continuous operator initiated electrical impulse to defeat the control system.

In connection with the foregoing object, it is an equally important object of my instant invention to provide means for preventing damage or destruction of electrically operated recording apparatus by continued application of an electrical impulse by the vehicle driver in an attempt to defeat the control system.

Still a very important object of this invention is to provide in a vehicle control system a novel seat switch construction capable of accurately indicating the presence of a passenger on a respective seat regardless of the particular position in which the passenger is sitting relative to the location of a respective seat switch.

Another highly important object of my instant invention is the provision of means in a vehicle control system for automatically shutting off the motor and headlights when the driver is absent from his seat for a predetermined period of time, thereby preventing fuel wastage and battery run-down while the vehicle is parked without a driver.

Briefly, the present invention relates to an electrical control system which may be utilized with a public carrier vehicle to coerce prompt and accurate recording by the driver of all passengers transported by the vehicle.

The system includes a seat switch for each of the passenger seating areas of the vehicle, with each switch disposed to be closed when a passenger sits on the area adjacent a respective switch. The closing of a seat switch results in energization of a control circuit which, after the lapse of a predetermined interval of time, operates switching structure resulting in the disabling of the vehicle's ignition system and the disconnecting of the starter motor from the battery.

To obviate the disabling consequences flowing from the closing of a seat switch, switching means is provided to de-energize the control circuit after it has been closed. The novel arrangement of the components of the switching means requires the vehicle operator to manipulate a manual control a number of times equal to one time for each passenger seat closed in order to properly operate the switching means for de-energizing the control circuit. Additionally, the components of the system and their arrangement, require such manipulation of the manual control regardless of the number of passengers seated in the vehicle or upon which seats they are located.

A counter unit is operably coupled with the manual control to record the number of times the latter is operated and, accordingly, the number of passengers seated in the vehicle. Means are included in the system to automatically reset the components to their proper positions when one or more of the passengers leave the vehicle, thereby insuring that the system is ready at all times for requiring the count of additional passengers.

Safeguards are built into the system to prevent tampering and wiring around certain components by some drivers who might attempt to cheat the system. Also, certain components are protected from an oversupply of electrical energy which might result from certain tactics in an attempt to avoid accurate recording of the passengers.

A seat switch provided for the driver's seat is disposed to be opened when the driver is not present on the seat. After a predetermined delay period, the opening of this seat switch operates the disabling switching structure, thereby rendering the ignition system and starter motor inoperative. At the same time, the vehicle headlights are automatically shut off. This combined disabling of the vehicle ignition system and shutting off of the headlights insures economy of operation by preventing the leaving of the engine running and the headlights burning when the driver is absent from the vehicle for extended periods of time.

Figure 1:
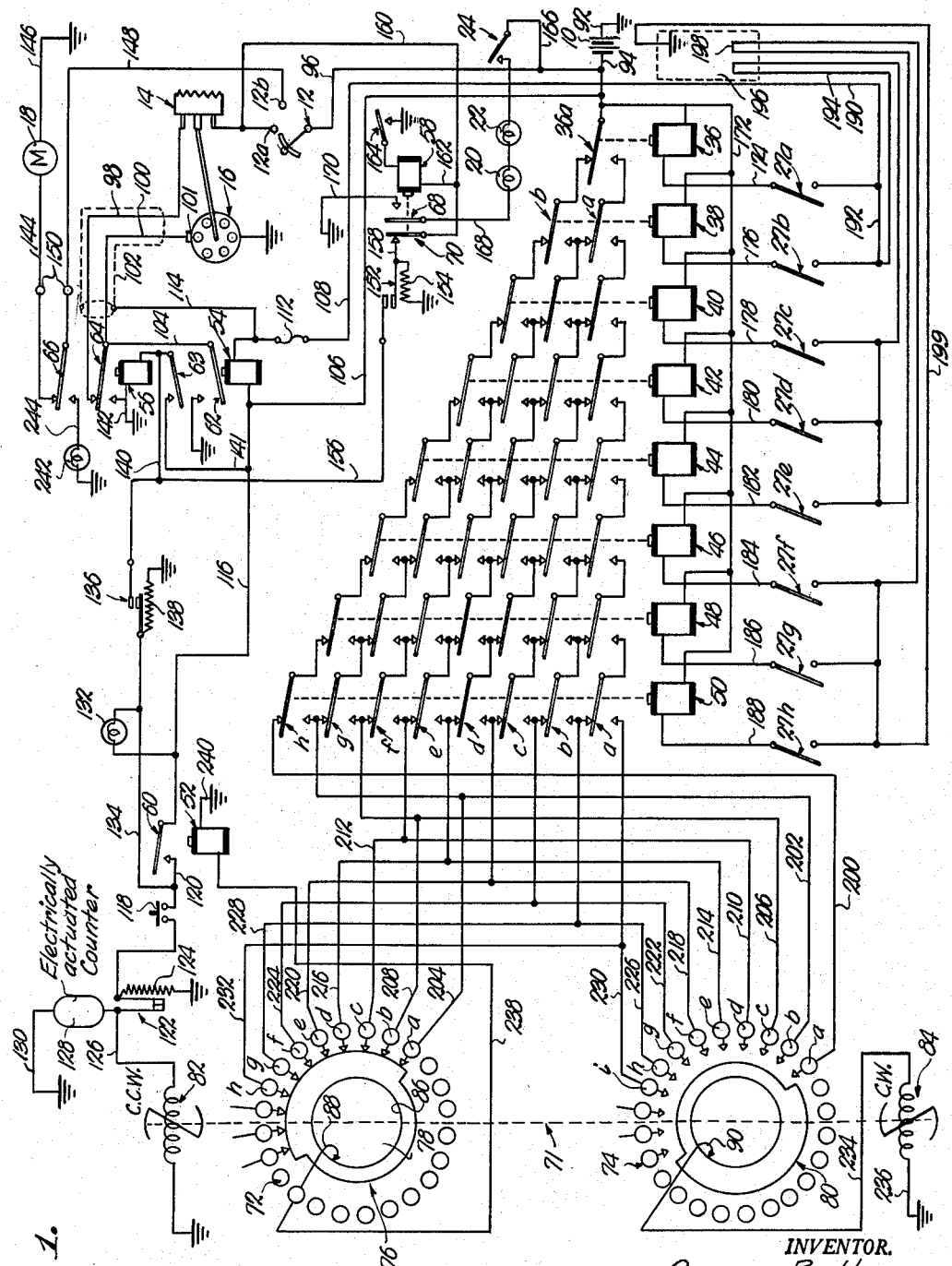
FIGURE 1 is a schematic diagram showing all of the electrical connections of the system and indicating their relationship with the mechanical portions of the apparatus employed in the system.
Figure 5:
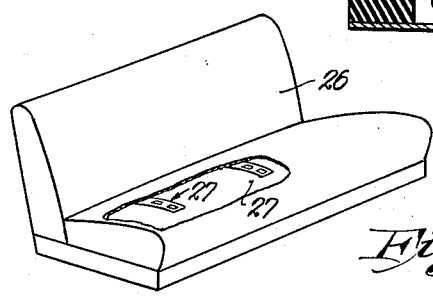
FIG. 5 is a perspective view, on a reduced scale, of a vehicle seat, with a part of the cover thereof broken away to show a typical installation of the seat switches adjacent passenger seating areas.

Referring now to the drawings, some of the parts of a conventional passenger vehicle are illustrated in FIG. 1, including a battery 10, ignition switch 12, ignition coil 14, distributor 16, starter motor 18, headlights 20 and 22, and headlight switch 24. It will be understood that the passenger carrying vehicle will normally include a number of passenger seats, and for purposes of illustration only, the system shown is particularly adapted for use in an airport limousine or the like having three main seats as 26 shown in FIG. 5. Each seat will accommodate more than one passenger and it will be generally understood that there will be three passenger seating areas for each seat 26.

Figure 3:
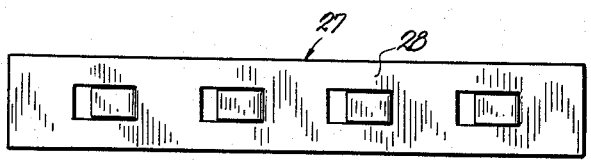
FIG. 3 is a plan view of the preferred embodiment of the seat switch used in the control system of this invention.
Figure 4:
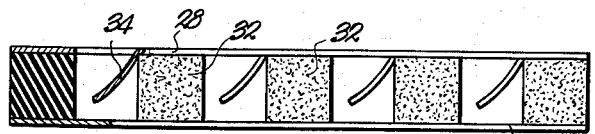
FIG. 4 is a side elevational view of the switch of FIG. 3 with parts thereof broken away and shown in cross section for clearness.

A seat switch 27 which may be of any suitable configuration, but is preferably constructed as shown in FIGS. 3 and 4, includes an elongated, upper contact 28 of an electrically conductive material held in spaced relationship from a lower contact 30 by a series of strips 32 of resilient material such as sponge rubber, resilient plastic material or the like.

A contact 34, which may be integral with upper contact 28, depends therefrom and is maintained in spaced relationship from lower contact 30. Contact 34 is close enough to lower contact 30 that any appreciable pressure upon upper contact 28 will cause the lower end of contact 34 to engage lower contact 30, thereby placing upper contact 28 and lower contact 30 in electrical engagement. A plurality of depending contacts 34 are provided for each switch 27 intermediate the strips 32, and a switch 27 is disposed adjacent the upper surface of the cushion of seat 26 so that at least one switch 27 is provided for each seating area thereon. A second switch 27 is disposed on the floor of the vehicle preferably under the floor mat, carpet or the like, adjacent each seating area and each switch 27 on the floor is electrically coupled in parallel with its corresponding switch 27 on the seat cushion. Both the floor and seat switches 27 perform the same function and, for simplicity, are shown as one switch 27 in the schematic diagrams. Hereafter, the switches on the floor and cushion are referred to as seat switches. The plurality of contacts 34 disposed along the switches 27 insure that the presence of a passenger upon a respective seating area makes electrical contact between upper contact 28 and lower contact 30 of the switches 27.

Referring to FIG. 1, it will be noted that seat switches 27a and 27b are provided for the two passenger seating areas normally situated adjacent the driver's seat, and seat switches 27c, 27d, 27e, 27f, 27g and 27h are provided for the passenger seating areas on the remaining seats 26 of the limousine. Each passenger seat switch 27a-27h has its own relay 36, 38, 40, 42, 44, 46, 48 and 50 respectively, and each relay has a coil and one or more single-pole, double-throw relay switches. It will be apparent from FIG. 1, that the relay 36, which is provided for seat switch 27a, has but one relay switch 36a. The next adjacent relay 38 has two relay switches 38a and 38b. Each succeeding relay 40–50 has one single-pole, double-throw relay switch more than the relay immediately next preceding it until the final relay 50 is provided with eight single-pole, double-throw relay switches 50a–50h. For clarity of illustration, only the letter designations have been used in the drawings to illustrate the respective relay switches, and only those switches for relays 36, 38 and 50 have been lettered. It will be readily understood however, that the first single-pole, double-throw relay switch of each relay is lettered "a," the second "b," etc. for all of the relays 36–50. Hereafter, in the description, each relay switch will be referred to by both its numeral and letter designation.

The system also utilizes four additional relays broadly numerated 52, 54, 56 and 58. Counting relay 52 includes a coil and a single-pole, single-throw relay switch 60. Tamper relay 54 also includes a coil and a single-pole, single-throw relay switch 62 and has a single-pole, single-throw relay switch 63. Main disabling relay 56 has a coil and a single-pole, double-throw relay switch 64, and a single-pole, double-throw relay switch 66. Auxiliary disabling relay 58 includes a coil and a pair of single-pole, single-throw relay switches 68 and 70 respectively. The functions of these relays 52, 54, 56 and 58 are hereinafter further described.

Additionally, the system includes a multiposition switch generally designated 71, having movable contacts engageable with a plurality of stationary contacts and means for advancing the movable contacts one position at a time and in either direction, which may be of any suitable design.

Although the specific construction of the multiposition switch per se forms no part of this invention, the type of switch just identified as satisfactory, includes a set of equally spaced, fixed contacts broadly designated 72, arranged in a circle and a set of similar contacts 74 also circularly arranged. A movable contact 76 is provided for the contacts 72 adjacent the latter and is rigidly secured to a shaft 78. A similar movable contact 80 is situated adjacent fixed contact 74 and is likewise rigidly secured to shaft 78 for rotation with contact 76. Means 82 for rotating shaft 78 a step at a time in a counterclockwise direction, whereby shaft 78 is rotated by steps which correspond to the equal spacing between the fixed contacts 72 and 74, are provided. Likewise, similar means 84 are provided for rotating shaft 78 a step at a time in a clockwise direction. Means 82 rotates shaft 78 one step in a counterclockwise direction each time means 82 is electrically energized, while means 84 advances shaft 78 one step in a clockwise direction each time means 84 is electrically energized.

Movable contact 76 is provided with an inner annular surface 86 which is engaged by an electrical contact 88 to insure an electrical connection between contact 88 and surface 86 as movable contact 76 rotates with shaft 78. The outer peripheral margin of contact 76 extends radially outwardly along a portion thereof to insure electrical contact between a plurality of the stationary contacts 72 and movable contact 76, while others of the stationary contacts 72 are out of electrical contact with another portion of the outer peripheral margin of movable contact 76. Movable contact 80 is similarly constructed, having a sliding contact 90. It will be noted that the enlarged, outer peripheral margin of contact 80 is oppositely disposed from the similar margin of contact 76 so that the contacts 74 which correspond to those fixed contacts 72 that are engaged by contact 76, will not be engaged by contact 80.

With reference now particularly to FIG. 1, the battery 10 has one of its terminals grounded through conductive means 92 and the other terminal connected to a "hot" conductive line 94. One contact 12a of the ignition switch 12, is connected to line 94 by conductive means 96. The ignition coil 14 is connected in series between one side of switch 12 and a contact of relay switch 64 by conductor 98. A second conductor 100 connects the movable pole of switch 64 with the breaker points (not shown) of distributor 16. Conductor 100 enters distributor 16 through a port 101 which is sealed to prevent tampering therewith.

An electrically conductive shield 102 which may include metallic coaxial web shielding, and which is shown only schematically in dash lines, encloses the conductors 98 and 100. Conductor 100 is electrically coupled with the movable pole of relay switch 62 by lead 104. The fixed contact of switch 62 is connected to ground. A line 106 electrically couples the coil of relay 54 with the "hot" line 94 and the other side of the coil is connected to ground through line 108, line 190, lead 192, line 194, line 198 and line 199.

A fuse 112 is provided in line 108 and a lead 114 electrically connects shield 102 with line 108 between the coil of relay 54 and fuse 112. A line 116 coupled with line 106, is connected with the movable pole of relay switch 60 and the fixed contact thereof is connected with a single-pole, single-throw push button switch 118 by line 120. A thermoelectric switch 122 which may be of the bimetallic variety having a pair of closed contacts and a grounded heating element 124, is connected in series between switch 118 and means 82 for rotating shaft 78 in a counterclockwise direction, by line 126. The other side of means 82 is connected with ground. Line 126 is electrically connected to electrically actuated countermeans 128 which may include any suitable means for recording an impulse of electrical energy directed thereto, and it will be understood that each electrical impulse will represent a passenger to be counted as will be explained in detail later. The other side of countermeans 128 is connected to ground through lead 130.

An indicator light 132 is connected to line 116 and to line 120 by line 134, and the latter is connected to a thermoelectric switch 136 having a pair of normally open contacts and a heater element 138 which is connected to one of the contacts of switch 136 and to ground. The other contact of switch 136 is coupled to one side of the coil of relay 56 by line 140, and the other side of the coil is connected to ground by lead 142. The movable pole of switch 63 is connected to line 140 and the normally closed fixed contact thereof is connected to line 116 by a line 141. The normally open contact of relay switch 64 is coupled to lead 142.

The normally closed contact of relay switch 66 is coupled to starter motor 18 by line 144 with the other side of motor 18 connected to ground by lead 146. The movable pole of switch 66 is connected to the starting position contact 12b of ignition switch 12 by line 148. A pair of connections 150 are provided in respective lines 144 and 148 to disconnect the components of the system from the starter motor in case malfunctioning of any of the components should make it desirable. A thermoelectric switch 152, having a pair of normally open contacts and a heater element 154 connected with one contact and to ground, has the other contact electrically coupled with line 140 by conducive means 156. The contact of switch 152 which is connected to heater means 154, is coupled with the fixed contact of relay switch 70 by lead 158, while the movable pole thereof is coupled with ignition switch 12a by line 160.

The coil of relay 58 is coupled with line 160 by lead 162, and the other side of the coil is connected to a seat switch 164 which is preferably identical to the switches 27 and which is disposed in seat 26 adjacent the area occupied by the vehicle operator and in position to be closed whenever the operator is sitting in position to drive the vehicle. The other side of switch 164 is connected with ground.

The vehicle headlights 20 and 22 are connected in series and are coupled with conductive means 96 through light switch 24, by line 166, with the other side of lights 20 and 22 coupled with the movable pole of relay switch 68 by line 168. The fixed contact of switch 68 is connected to ground by lead 170.

The coils of each of the seat relays 36–50 respectively, are electrically coupled in parallel, having one side thereof connected to "hot" line 94 by line 172 with the other side of each coil connected to respective seat switches 27a–27h by leads 174, 176, 178, 180, 182, 184, 186 and 188 respectively. The fixed contacts of seat switches 27a and 27b, are connected to grounded lead 199 by lines 194 and 198 and are coupled together by lead 192. They are also connected to the fixed contacts of seat switches 27c–27e by line 194 which will be seen in FIG. 1, to extend into a sealed box 196 shown in dash lines in FIG. 1 which also includes the grounding point for lead 199. The purpose of box 196 will be explained in detail later. It will suffice to note that the fixed contacts for switches 27c, 27d and 27e, are coupled together and also coupled to the fixed contacts of seat switches 27f–27h (in turn coupled together) by line 198 which also extends into and out of sealed box 196. Switches 27f–27h are connected to ground by line 199.

As is readily apparent from FIG. 1, the movable pole of relay switch 36a, corresponding to the first passenger seat area, is connected to "hot" line 96. When the relay switches are in their normal positions with the coils of the relays not energized, one fixed contact of each relay switch is electrically connected with the movable pole of the next additional relay switch of the next succeeding relay. Additionally, the normally open fixed contact of each relay switch is electrically connected with the normally closed fixed contact of the next precedingly lettered relay switch in the same relay. The other, and normally open, fixed contact of each relay switch is electrically connected with the movable pole of the correspondingly numbered relay switch of the next succeeding relay. Thus, it is readily apparent that when no relay coil is energized, the relay switches are in their positions electrically connecting each relay switch with the next additionally lettered relay switch of the next succeeding relay, whereas, whenever a relay coil is energized, all of the movable contacts of the relay switches of that particular relay are shifted to positions connecting its relay switches with correspondingly lettered relay switches of the next succeeding relay.

The normally closed contact of relay switch 50h is connected with a single contact 74a of fixed contacts 74 by line 200. For simplicity of illustration, each contact of fixed contacts 72 and 74 hereinafter described by both the numeral and letter designations, are indicated in the drawings by letter designation only.

The normally open fixed contact of switch 50h, and the normally closed fixed contact of switch 50g, are connected to fixed contact 74b by line 202, and to fixed contact 72a by line 204. The normally open contact of switch 50g, and the normally closed contact of switch 50f, are connected to contact 74c by line 206, and to contact 72b by line 208. The normally open fixed contact of switch 50f and the normally closed contact of switch 50e, are connected to a fixed contact 74d by a line 210 and are similarly connected with a fixed contact 72c by a line 212.

The normally open contact of switch 50e and the normally closed contact of switch 50d, are connected with a fixed contact 74e by line 214, and a fixed contact 72d by a line 216. Similarly, the normally open contact of switch 50d, and the normally closed contact of switch 50c, are electrically coupled with a fixed contact 74f by line 218, and a fixed contact 72e by a line 220. The normally open fixed contact of switch 50c and the normally closed contact of switch 50b, are connected with a fixed contact 74g by line 222, and a fixed contact 72f by line 224, while the normally open fixed contact of the switch 50b, and the normally closed contact of first switch 50a, are coupled with a fixed contact 74h by line 226, and a fixed contact 72g by line 228. The normally open fixed contact of switch 50a is connected with a fixed contact 74i by line 230, and a fixed contact 72h by line 232. The sliding contact 90 of the multiposition switch is connected with means 84 by line 234, and the other side of means 84 is connected to ground by lead 236. The sliding contact 88 of the multiposition switch is connected with one side of the coil of relay 52 by line 238, and the other side of the coil is grounded through lead 240. A pilot light 242 is connected in series between the normally open fixed contact of switch 66 and ground by line 244.

The operation of the system in which it accomplishes the aforementioned objects, and others which will be made apparent, will now be considered.

If the carrier vehicle contains no passengers and the driver is positioned on the operator's seat, his presence thereon will cause the closing of the operator's seat switch 164, thereby completing a circuit for energizing the coil of relay 58 which is traceable from battery 10 through line 94, conductive means 96, ignition switch 12, line 160, lead 162, the coil of relay 58, and switch 164 to ground. The energization of relay 58 shifts the movable contact of switch 68 into engagement with the fixed contact thereof, providing for a headlight energizing circuit which may be completed upon closing of light switch 24 if desired. Also, the movable pole of switch 70 is withdrawn from the fixed contact thereof to prevent the completion of a circuit for energizing the thermo-electric switch 152 traceable from ignition switch 12 through line 160, switch 70, lead 158, heating element 154 to ground. Thus, the normally open contacts of switch 152 remain open for a purpose to be described later.

Proper operation of the vehicle engine is assured with an intact ignition circuit traceable from battery 10 through line 94, conductive means 96, switch 12, the primary windings of ignition coil 14, conductor 98, switch 64, conductor 100, and through breaker points (not shown) of distributor 16 to ground. The secondary windings of coil 14 are electrically connected to the spark plugs of the vehicle through the distributor rotor for firing of the cylinders in sequential order, as is conventional. Switch 66 is in its normal position coupling line 148 with line 144, allowing for the energization of starter motor 18 upon proper positioning of the ignition switch 12 as will be readily understood.

Whenever a passenger enters the vehicle, its presence upon any one of the seating areas will cause the depending contacts 34 to engage the lower contact 30 of a respective seat switch 27, thereby completing an electrical circuit for a respective relay 36–50. The particular relay which is energized, will of course, depend upon which of the seat switches is closed, but regardless of which relay is energized, such energization breaks the connection which is normally made between battery 10 through line 94, and the last switches of each relay with contact 74a through line 200. The connection from battery 10 is transferred at the activated relay to the next to the last relay switches of the succeeding unoperated relays.

The illustration in FIG. 1 of the relative positions of the movable contacts 76 and 80, thoroughly demonstrate that the connection with battery 10 is broken at contact 74a when none of the seat switches 27a–27h are closed because the enlarged portion of movable contact 80 is not in a position to engage the fixed contact 74a. Thus, no electrical energy flows to the electrically responsive switching means in the form of the multiposition switch, and the system is in status quo. On the other hand, as soon as one passenger closes any switch 27a–27h and results in connecting the battery 10 ultimately with the next to the last relay switches in the succeeding relays, lines 202 and 204 are energized. A circuit may then be traced for activating electrically responsive switching structure from line 202 through stationary contact 72a, the enlarged portion of movable contact 76, sliding contact 88, line 238, the coil of such electrically responsive structure in the form of relay 52, and lead 240 to ground.

This circuit energizes relay 52 and causes the closing of switch 60 in a control circuit which may be traced from battery 10, line 94, line 106, line 116, switch 60, line 120, line 134, and heater element 138 to ground. The closing of this circuit illuminates light 132 to indicate to the operator of the vehicle, that unless something is done, the heater element 138 will close the contacts of switch 136 after a predetermined delay, thereby energizing the coil of relay 56.

When the coil of relay 56 is energized through closed contacts of switch 136, line 140, lead 142 to ground, the movable pole of switch 64 is shifted from contact with conductor 98 and into engagement with its other contact which is connected to lead 142. Thus, the primary windings of the ignition coil 14 are disconnected from the distributor 16 and an ignition disabling circuit comprising conductor 100, switch 64 and lead 142, is completed to ground. The grounding of distributor 16 has the effect of rendering the engine of the vehicle inoperative.

The energizing of the coil of relay 56 as previously explained, additionally shifts relay switch 66 from its position, making contact between lines 148 and 144 to a position connecting line 148 with line 244, thereby disconnecting motor 18 from possible connection with battery 10 and resulting in a circuit illuminating pilot light 242 whenever the ignition switch 12 is turned to the engine starting position. This will readily indicate to the vehicle operator that his inability to start the engine has resulted from the energizing of relay 56.

The steps that must be taken by the vehicle operator to avoid the closing of the ignition disabling circuit and the disconnecting of the starter motor, or to re-open such circuit if it has already occurred, is to depress the manually operable switch 118 which is conveniently located within the control of the operator. This has the effect of completing a circuit from line 120, through switch 118, the closed contacts of switch 122, line 126, and means 82 to ground, thereby rotating shaft 78 of the multiposition switch one step in a counterclockwise direction.

Inasmuch as heating coil 124 is connected with line 120 and ground, it will be energized to effect the opening of the normally closed contacts of switch 122 after a predetermined time delay. This has the effect of preventing the holding of switch 118 closed for sufficient time to effect the rotation of shaft 78 more than the one step. Additionally, electrically actuated counting means 128 is energized through a circuit from line 126, means 128, lead 130 to ground, thereby resulting in the actuation of the means 128 to record the presence of the passenger in the vehicle which has resulted in the closing of one of the seat switches 27.

As shaft 78 rotates in a counterclockwise direction, the electrical connection between fixed contact 72a and the enlarged portion of movable contact 76, is removed, resulting in the de-energization of the coil of relay 52 and the opening of relay switch 60. Thus, the ignition disabling circuit is returned to its normally open position and switch 66 again connects line 148 with line 144, allowing the starter motor 18 to become operative.

If two passengers are simultaneously seated upon respective passenger seating areas within the carrier vehicle, the resultant energizing of two of the relays 36–50 has the effect of ultimately connecting battery 10 with the second from the last relay switches of the remaining unoperated relays and results in the disconnecting of the electrical energy from lines 202 and 204 and the energizing of lines 206 and 208. This results in the necessity for the depressing of switch 118 by the operator to advance shaft 78 in a counterclockwise direction one additional step to avoid closing of the control circuit as previously explained.

Similarly, the closing of each additional passenger seat switch 27 requires the depressing of switch 118 one additional time to effect rotation of shaft 78 an additional step in a counterclockwise direction to avoid the disabling effects of the closing of the control circuit. Manifestly, if all of the eight seats in the limousine are occupied, the switch must be depressed eight times to effect the rendering of an actuating electrical pulse to the counting means 128, thereby making a record of the number of passengers carried within the vehicle. Thermoelectric switch 122 prevents the holding of switch 118 in its closed position to effect continuous rotation of shaft 78 to avoid operation of the counter means 128, and also to prevent damaging to the latter which might result from too long an application of electrical energy.

Figure 2:
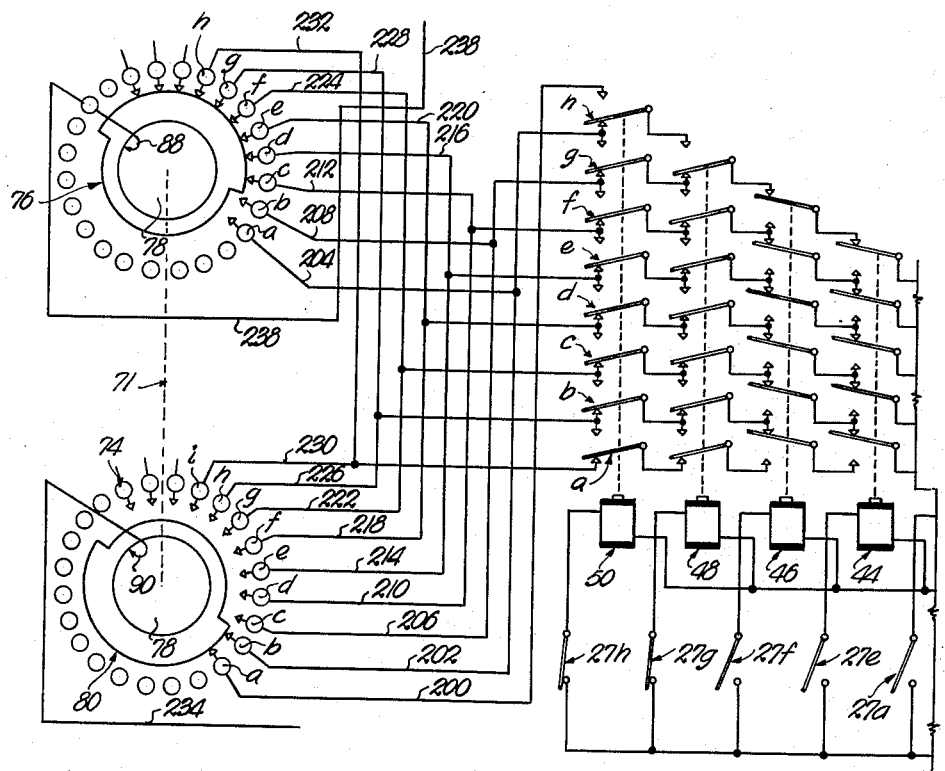
FIG. 2 is a fragmentary schematic diagram of a portion of the system represented in FIG. 1, showing two of the passenger seats closed and indicating the relative positions of the respective relay switches and the multiposition switches after the appropriate tally of the passengers has been recorded.

It will be obvious from an inspection of FIGS. 1 and 2, that regardless of the order in which the respective seat switches are operated, the electrical connection between battery 10 is made with the stationary contacts 72 in regular succession, advancing one lettered contact for each passenger seat switch which is closed.

Inasmuch as movable contact 80 rotates with shaft 78 along with movable contact 76, the rotation of shaft 78, which has been previously described, to require actuation of the counting means 128, results in the enlarged portion of movable contact 80 being placed in contact with one or more of the fixed contacts 74a–74i, the number thereof depending upon the number of times shaft 78 is rotated in a counterclockwise direction. The engagement of the movable contact 80 with the fixed contacts 74, will always be with that lettered contact which has next previously been disconnected from connection with battery 10 by the shifting of the relay switches through energization of the relays 36–50 by the closing of a particular passenger seat switch. In other words, the electrical contact effected by the movable contact 80 and the fixed contacts 74, will always be one fixed contact behind the similar contact between the enlargement of movable contact 76 with fixed contacts 72. Thus, so long as seat switches 27, resulting in counterclockwise movement of shaft 78, remain closed, no energy passes through sliding contact 90 and line 234 to means 84 for rotating the shaft 78 in a clockwise direction. However, as soon as such of the seat switches 27 as have been closed, are again re-opened, contact through the respective relay switches 36–50, is reestablished to energize certain of the fixed contacts 74 which are now in contact with the enlarged portion of movable contact 80. This results in an energizing circuit traceable through fixed contacts 74, movable contact 80, sliding contact 90, line 234, means 84, lead 236 to ground, thereby rotating shaft 78 in a clockwise direction by steps until the enlarged portion of movable contact 80 is disengaged from the fixed contacts 74 which are receiving energy from battery 10 through the switches of the relays 36–50. This automatically shifts movable contact 76 into position so that when any seat switch 27 is again closed by a passenger sitting on a particular seating area, that passenger's presence must be recorded, as previously explained.

Manifestly, it does not matter which of the seat switches 27a–27h are again re-opened after having once been closed, or in what sequence such re-opening occurs. The novel arrangement of the relay switches of the respective relays 36–50 provide for appropriate energizing of the fixed contacts 74 to require clockwise rotation of shaft 78 one step to accommodate for each seat switch 27 which is re-opened.

The delay built into the system by way of the time necessary for the heating element 138 of the thermoelectric switch 136 to close the normally open contacts thereof, gives the driver some time to request a passenger to occupy one seating area in the vehicle should the passenger be positioned in a way which causes the closing of more than one seat switch 27. Such improper positioning will be signalled to the driver by the illuminating of light 132 even after the driver has properly recorded the number of passengers who are present in the vehicle. The control circuit will not disable the vehicle until switch 136 closes and such disabling will not result if the passenger moves to a single seating area.

The presence of switches 27 on the floor area, coupled in parallel with corresponding switches 27 on the cushion, allow for a passenger to arise momentarily from one seating area and to sit down on another seating area without requiring further action on the part of the driver to avoid disabling of the vehicle. As the weight is shifted from the cushion, possibly opening the contacts of the switch 27 adjacent the cushion, the weight is transferred by the feet to the floor holding the switch 27 on the floor in its open position. The weight is shifted on an adjacent seating area to open the corresponding switch 27 as it is removed from the floor to permit opening of the switch 27 on the floor. The net result is no disabling of the vehicle from the change of seats.

To prevent the possible defeat of the coercive objectives of the system of this invention by the short-circuiting of the disabling components by establishing electrical connection between conductors 98 and 100, a conductive shield 102 is strategically located around these conductors. Any attempt to short these conductors together will result in establishing electrical contact with shield 102 and one or the other of the conductors 98 or 100, thereby energizing lead 114 and establishing a circuit from lead 114 through fuse 112, line 108, line 190, line 194, line 198 and line 199 to ground.

Such circuit imposes additional current upon line 108 through fuse 112, causing the latter to burn out and breaking the normally closed energizing circuit for relay 54 which may be traced from battery 10, line 94, line 106, through the coil of relay 54, fuse 112, line 108, line 190, line 194, line 198 and line 199 to ground. When relay 54 is energized, its switches 62 and 63 are held in their open positions. However, when its energizing circuit is broken as from the blowing of fuse 112, switch 62 shifts to its normally closed position, connecting lead 104 with ground. Switch 63 also closes, connecting the coil of relay 56 to "hot" line 116 though line 141, thereby energizing the relay. This results in the grounding of distributor 16 through conductor 100, lead 104, switch 62 to ground and the disconnection of starter motor 18 from battery 10 by the opening of switch 66. The distributor is additionally grounded through conductor 100, switch 64, lead 142 to ground.

An alternate method of attempting to beat systems of the type described, has been to prevent a connection with one side of the respective seat switches 27 to ground. With the connection made by a simple contact connection from a portion of the seat 26 with the frame of the vehicle, it would be a simple matter to prevent electrical connection by inserting some nonconductive material between the seat and the frame. To avoid this method of "beating the system," all of the seat switches 27c are connected in parallel and all are connected together with the connection between respective seats 26 being made within a sealed box 196 to prevent disconnection thereof and tampering therewith. Aditionally, the common ground for the seat switches 27a–27h is established within the sealed box 196.

Operators of passenger carrier vehicles or the like have sometimes been guilty of leaving their vehicle for extended periods of time with the motor running and perhaps the headlights burning. This conduct has resulted in unnecessary discharge of the vehicle battery and a wastage of fuel. Accordingly, the system includes a driver's seat switch 164 which normally energizes the coil of relay 58 as has been previously explained. However, when the driver absents himself from the driver's seat, switch 164 returns to its normally open position and relay 58 is de-energized. The movable pole of switch 70 is allowed to return to its normally closed position, thereby establishing a circuit traceable from battery 10, line 94, conductive means 96, ignition switch 12, line 160, switch 70, lead 158 and heat element 154 to ground.

After a predetermined delay, the normally open contacts of switch 152 are closed, continuing the circuit through the latter, conductive means 156, line 140, the coil of relay 56, lead 142 to ground. This results in the closing of the ignition disabling circuit and the opening of the starter motor energizing circuit as has been previously explained. The disabling circuit then kills the motor which may not again be started until driver's seat switch 164 is again closed.

Simultaneously, de-energizing of the coil of relay 58 allows the movable pole of switch 68 to return to its normally open position. This breaks the possible connection of lights 20 and 22 to ground, thereby extinguishing them if they have been connected with battery 10 by the closing of light switch 24.

Having thus described the invention, what is claimed as new and desired to be secured by Letters Patent is:

1. In an electrical control system for a carrier vehicle having a plurality of passenger seats, an ignition circuit and a battery for energizing the ignition circuit, the combination of: a normally open ignition disabling circuit adapted for coupling in shunt arrangement with said ignition circuit for rendering the latter inoperable when the disabling circuit is closed; electrically responsive disabling switching structure coupled with the disabling circuit for closing the latter when the structure is operated; a normally open control circuit adapted for coupling with said battery and coupled with the structure for operating the latter when the control circuit is closed; a seat switch for each of said seats and disposed to be closed by a passenger positioned on a corresponding seat; an electrically responsive switching element for each of said seat switches operably coupled with respective seat switches and to said control circuit for closing the latter when one or more of said seat switches are operated; switching means operably coupled with said control circuit for re-opening the latter after said control circuit is closed by said electrically responsive switching elements, said switching means having contacts shiftable to positions to open said control circuit upon being operated a number of times corresponding to the number of seat switches operated at a given time; and means operably coupled to said switching means, under the control of the vehicle operator for operating the switching means to prevent closing of said disabling circuit when one or more passengers are positioned on said seats, to thereby coerce the operator to operate said switching means a number of times corresponding to the number of passengers seated upon said passenger seats.

2. In a system as set forth in claim 1, wherein said structure includes a relay having a relay coil and a normally open relay switch adapted to close when the relay coil is energized, the relay switch being coupled in series with the disabling circuit, the relay coil being coupled with the control circuit for energization by the latter.

3. In a system as set forth in claim 1, wherein said structure includes a device having an electrically responsive mechanism and a normally open, delayed action switch operably coupled with the mechanism for closing a predetermined period of time after the mechanism is energized, the delayed action switch being operably coupled with the disabling circuit for closing the latter when the delayed action switch is closed, the mechanism being coupled with the control circuit for energization by the latter.

4. In a system as set forth in claim 3, wherein the delayed action switch is coupled in series with the control circuit.

5. In a system as set forth in claim 3, wherein said structure further includes a relay having a relay coil and a normally open relay switch adapted to close when the relay coil is energized, the relay switch being coupled in series with the disabling circuit, the relay coil being coupled through the delayed action switch with the control circuit for energization by the latter when the mechanism has closed the delayed action switch.

6. In a system as set forth in claim 1, wherein is provided a passenger counter unit operably coupled with the means for operating the switching means for registering another count each time the means for operating the switching means is operated.

7. In a system as set forth in claim 1, wherein said switching means includes a multiposition switch having means for advancing the same one step at a time in either a clockwise or a counter clockwise direction.

8. In a system as set forth in claim 1, wherein said switching elements include a relay having a relay coil and one or more single-pole, double-throw relay switches with the pole of each switch normally in a position engaging one contact and adapted to be shifted from said normal position to a position engaging the other contact thereof when the relay coil is energized.

9. In a system as set forth in claim 8, wherein each of said relay coils is electrically coupled in parallel with said battery and the relay of the first of said elements has one relay switch and the relay of each succeeding element has one switch more than the relay of the respective preceding element.

10. In a system as set forth in claim 9, wherein the said one contact of each relay switch is connected with the said other contact of the next additional switch of that particular relay and to the pole of the next additional switch of the relay of the next succeeding element corresponding to the next succeeding seat switch.

11. In a system as set forth in claim 10, wherein said relay switches are coupled to said switching means and are disposed to couple said battery with a position of said multiposition switch corresponding to the number of said relays operated by passengers sitting on corresponding passenger seats.

12. In a system as set forth in claim 1, wherein is provided a relay having a relay coil connected to said battery for energization by the latter, a normally open secondary circuit operably coupled with said ignition circuit in shunt arrangement with the latter for rendering the latter inoperable when the secondary circuit is closed, a normally closed relay switch operably coupled with said relay and coupled in series in said secondary circuit, and means operably coupled with said ignition circuit and said disabling circuit for de-energizing said relay coil upon tampering with said disabling circuit, whereby said relay switch is returned to its closed position as a result of said tampering, thereby closing said secondary circuit rendering the ignition circuit inoperable.

References Cited in the file of this patent
UNITED STATES PATENTS

| | | |
|---|---|---|
| 1,229,473 | Keenan | June 12, 1917 |
| 1,809,651 | Van Amburg et al. | June 9, 1931 |
| 1,878,596 | Papaefthemoue | Sept. 20, 1932 |
| 2,598,348 | Butler | May 27, 1952 |
| 2,779,899 | Lenox | Jan. 29, 1957 |
| 2,801,373 | Schwarzenbach et al. | July 30, 1957 |
| 2,934,159 | Butler | Apr. 26, 1960 |